Oct. 22, 1968  H. C. MITCHELL  3,406,483
COMBINATION HINGE-LATCH DEVICE
Filed March 16, 1967  2 Sheets-Sheet 1

INVENTOR.
Herbert C. Mitchell
BY John R. Faulkner
E. Dennis O'Connor
ATTORNEYS.

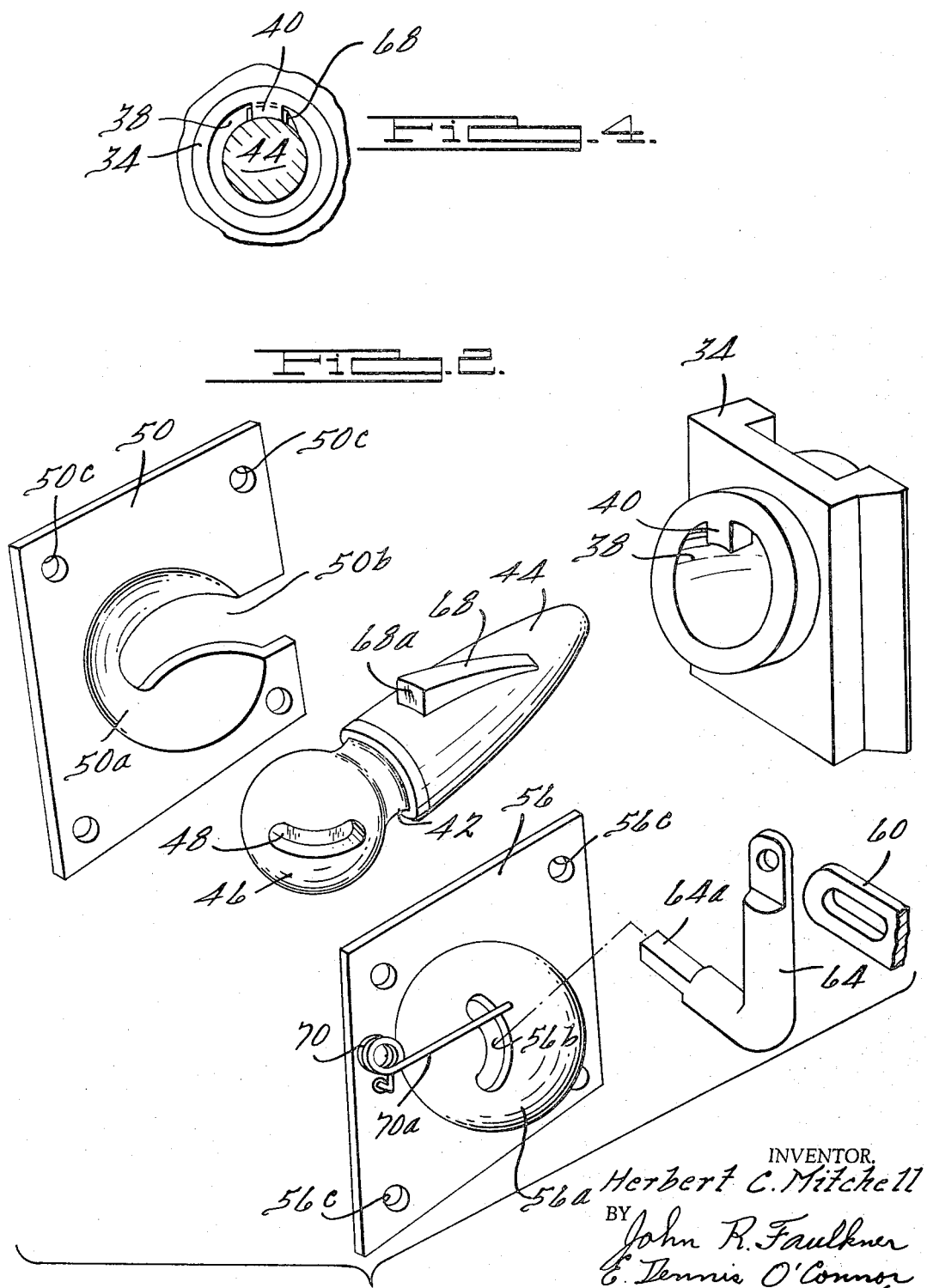

United States Patent Office 3,406,483
Patented Oct. 22, 1968

3,406,483
COMBINATION HINGE-LATCH DEVICE
Herbert C. Mitchell, St. Clair Shores, Mich., assignor to Ford Motor Company, Dearborn, Mich., a corporation of Delaware
Filed Mar. 16, 1967, Ser. No. 623,608
8 Claims. (Cl. 49—192)

ABSTRACT OF THE DISCLOSURE

A combination hinge-latch device securing a dual action door-tailgate to the vehicle body members framing a vehicle body opening. One end of an elongated latch member is pivotally secured to the door by means of bearing members that allow rotation of the latch member about its longitudinal axis. The other end of the latch member is held in a keeper aperture on the body members by a bayonet coupling means formed on the latch member and keeper. The bayonet coupling means are yieldably biased into a latched position but may be urged manually into an unlatched position. Cam means automatically urges the coupling into an unlatched position during insertion of the latch member into the keeper aperture.

Background of the invention

Tailgates for combined passenger and cargo carrying vehicles popularly known as "station wagons" are conventionally hinged at their lower edge for swinging movement about a horizontal axis. This conventional hinging arrangement has certain inherent disadvantages in impeding egress and ingress to the cargo area or station wagon third seat. United States patent application Ser. No. 574,793, filed Aug. 24, 1966, and assigned to the assignee of this invention, discloses a dual action closure for a vehicle body opening, particularly a dual action door-tailgate for the rear opening in a station wagon body. Such a dual action door-tailgate may be operated either as a door swingable about a substantially vertical hinge axis or as a tailgate swingable about a substantially horizontal hinge axis.

The dual action door-tailgate of the above-mentioned application is secured to the rear access frame structure at four attaching points. The attaching mechanism located at two of these points of attachment are necessarily combination hinge-latch mechanisms. This invention provides a unique combination hinge-latch mechanism that may be used in conjunction with such a dual action door-tailgate.

Brief summary of the invention

A combination hinge-latch mechanism constructed in accordance with this invention is adapted to be unitized in combination with a vehicle body of the station wagon type having a passenger-cargo carrying area, body members framing a substantially upright access opening to the passenger-cargo carrying area and a dual action door tailgate having four points of attachment to the body members. Combination hinge-latch mechanisms connect the door tailgate to the body members at two of the points of attachment.

A combination hinge-latch mechanism, as embodied in the present invention, includes a keeper defining a recess secured to one of the body members and an elongated latch member having one of its ends received in the keeper recess. Cooperating hinge means on the other end of the latch member and the door-tailgate pivotally secure the latch member to the door-tailgate while permitting limited relative rotation of the latch member about its longitudinal axis. Cooperating latch means formed on the keeper and latch member constitute a bayonet coupling. Operating means on the door-tailgate are operatively coupled to the latch member for rotating the latter and disengaging the bayonet coupling.

Brief description of the drawings

FIGURE 2 is an exploded view of the essential elements of the hinge-latch mechanism of this invention;
FIGURE 4 is a sectional view taken along the line 4—4 of FIGURE 3.

Detailed description of the invention

Figure 1:
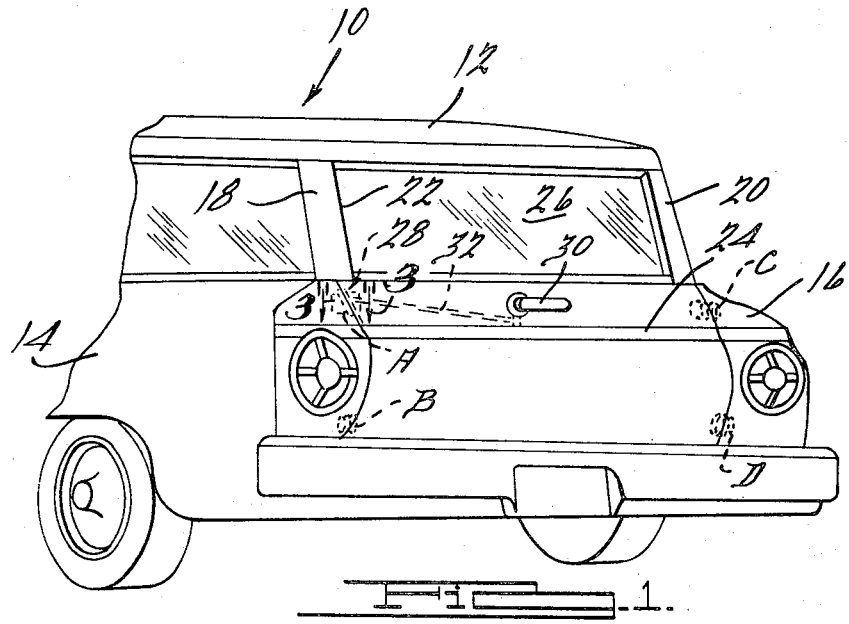
FIGURE 1 is an isometric view of a portion of a motor vehicle station wagon having a dual action door-tailgate utilized in combination with the hinge-latch mechanism of this invention.

Referring now in detail to the drawings, the numeral 10 denotes a station wagon having a passenger-cargo area. Station wagon 10 includes a roof 12, a left rear quarter panel 14, a right rear quarter panel 16, left D-pillar 18 and right D-pillar 20. These members define and frame a rear access opening 22 to the vehicle passenger-cargo area. A closure member in the form of a dual action door-tailgate 24 is provided for opening 22 and is attached to the motor vehicle structural members at points A, B, C and D. Door-tailgate 24 carries a retractable window panel 26 in a conventional manner.

Assuming that door-tailgate 24 is pivoted at points A and B when operating as a door, the attachment mechanisms located at points A and D must comprise combination hinge-latches, the attachment mechanism at D must comprise a multi-hinge mechanism having a first pivot axis extending substantially horizontally and a second hinge axis extending substantially vertically and the attachment mechanism at point C must comprise a simple latch mechanism. This arrangement is discussed in greater detail in the above-mentioned application Ser. No. 574,793.

A combination hinge-latch constructed in accordance with this invention is denoted by the numeral 28 and may be manually controlled through operating means including a handle 30 operatively secured to a connecting rod 32 as will be discussed in greater detail below.

The combination hinge-latch mechanism 28 includes a keeper 34 secured to a quarter panel 14 by a fastener 36 and having a recess 38 formed therein. A shoulder 40 is integrally formed on keeper 34 and extends into aperture 38. An elongated latch member 42 is secured to door-tailgate 24 so that one end 44 thereof, having a shape approximating the shape of recess 38, may be received within recess 38 as illustrated in FIGURE 3.

The end of latch member 42 remote from end 44 comprises a substantially spherical enlargement 46 having formed therein an elongated recess 48 oriented substantially parallel to the longitudinal axis of member 42. Spherical enlargement 48 is pivotally secured to door-tailgate 24 in a manner that permits rotation of latch member 42 about its longitudinal axis. The attachment means include a first bearing plate 50 having a concave portion 50a receiving a portion of enlargement 46 and a second bearing plate 56 having a concave portion 56a receiving a second portion of enlargement 46. Plates 50 and 56 are secured to an interior structural member 24a of door-tailgate 24 by means of fasteners 52 and 54 that extend through holes 50c and 56c formed in plates 50 and 56, respectively.

Figure 3:
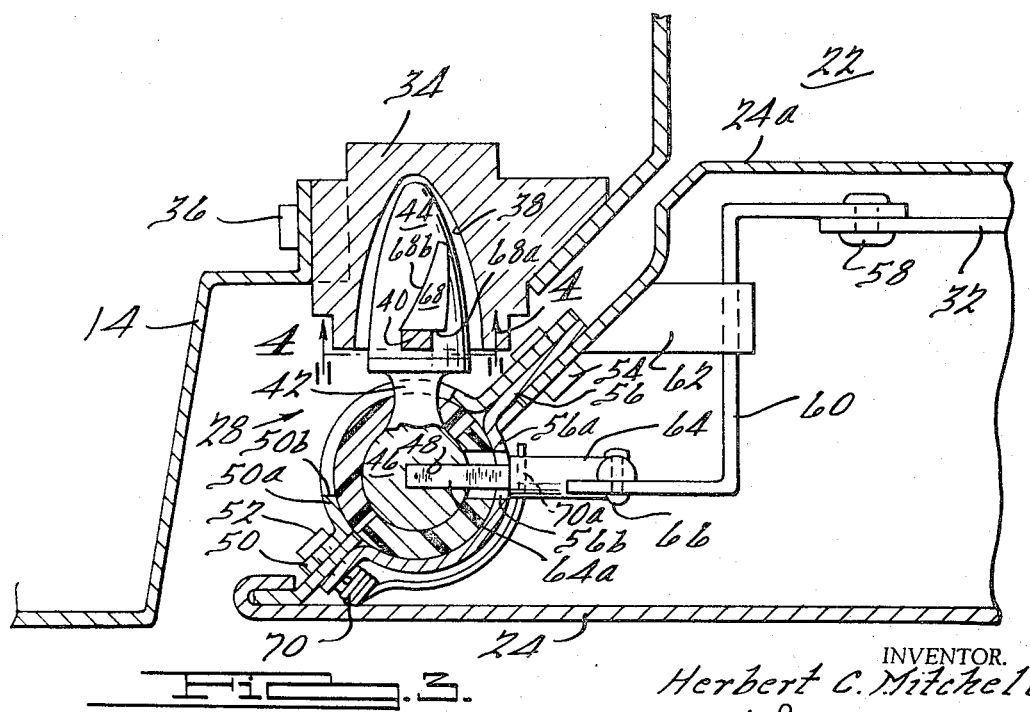
FIGURE 3 is a top assembly view of the hinge-latch mechanism of this invention having some parts in section.

As is illustrated in FIGURE 3, bearing plates 50 and 56 cooperate to form a bearing surface partially surrounding spherical enlargement 46 while permitting rotation of latch member 42. Bearing plate 50 does not impede pivotal movement of door-tailgate 24 in a clockwise direction as viewed in FIGURE 3 due to the presence of a slot 50b formed in plate 50. The dimensional width of slot 50b exceeds the dimensional thickness of the mid-portion of latch member 42 and thus receives this portion of latch member 42 during the above-described pivotal movement of door-tailgate 24.

Rotation of latch member 42 is accomplished by manual rotation of handle 30. As described above, handle 30 is secured to linkage 32 which in turn is pivotally secured to one arm of a crank 60 by fastener 58. Crank 60 has its arms relatively angularly inclined and is pivotally journalled in a structural member 62 that extends from the interior wall 24a of door-tailgate 24. A fastener 66 pivotally connects the other end of crank 60 to an L-shaped actuating arm 64. One end 64a of actuating arm 64 has a reduced cross sectional area and extends through a slot 56b in bearing plate 56 and projects into recess 48 formed in spherical enlargement 46. It may thus be seen that rotation of handle 30 results in the rotation of latch member 42 as a rotational force applied to the handle is transmitted to the latch member through linkage 32, crank 60 and actuating arm 64.

Formed on the exterior surface of end 44 of latch member 42 is a helical projection 68 having an outwardly facing surface 68a and an inclined cam surface 68b. Projection 68, together with keeper shoulder 40, constitute a bayonet coupling that retains latch member end 44 within aperture 38 when projection surface 68a registers with shoulder 40 in a latched position as illustrated in FIGURE 3. Removal of latch member end 44 from the keeper aperture may be accomplished by rotating latch member 42 to the right (as viewed in FIGURE 3) into an unlatched position so that projection surface 68a is out of registry with shoulder 40.

Latch member 42 is yieldably biased into the latched position described above by a spring 70 mounted on bearing plate 56 and having one end 70a thereof extending below and bearing on end 64a of actuating arm 64 to urge end 64a upward. The upper extremity of slot 56b acts as a stop to upward movement by actuating arm end 64a and to following rotation of latch member 42, as the latter rotates in response to movement of the actuating arm.

The operation of the device is as follows: When latch member end 44 is secured within aperture 38 by the bayonet coupling, door-tailgate 24 may operate as a door swinging about a vertical hinge axis lying along a line extending from point A to point B. During this swinging movement, bearing plates 50 and 56 rotate with door-tailgate 24 about spherical enlargement 46. When it is desired to operate door-tailgate 24 as a tailgate for swinging movement about a substantially horizontal axis lying along a line extending from point B to point C, the bayonet coupling of hinge-latch 28 must be opened. This is accomplished by rotation of handle 30. As explained above, rotation of handle 30 causes a following rotation of latch member 42 against the force of spring 70 until surface 68a of projection 68 is out of registry with shoulder 40. Hinge-latch 28 does not restrict the desired movement of door-tailgate 24 due to this rotational movement.

During periods when hinge-latch 28 is open, as when door-tailgate 24 has been swung into an open position about the horizontal hinge axis described above, the force exerted by spring 70 rotates latch member 42 into its latched position. When it is desired to close and latch door-tailgate 24 from this position, however, it is not necessary to manipulate handle 30. As latch member end 44 moves into keeper recess 38, cam surface 68b will contact shoulder 40 and a force will be exerted overcoming the force of spring 70. Latch member 42 will thus rotate into the unlatched position until latch member end 44 extends into recess 38 a distance sufficient for projection 68 to clear shoulder 40 (FIGURE 3). At this time, spring 70 will force the rotation of latch member 42 into the latched position.

It may thus be seen that this invention provides a novel hinge-latch for a dual action closure member. This hinge-latch is particularly adapted to function as an attaching member for a station wagon dual action door-tailgate such as that disclosed in application Ser. No. 574,793.

It is to be understood that this invention is not limited to the exact construction as described above, but that various changes and modifications may be made without departing from the spirit and scope of the invention as defined by the following claims.

I claim:
1. In a vehicle body of the station wagon type having a passenger-cargo carrying area, body members framing a substantially upright access opening to said passenger-cargo carrying area, a dual action door for said access opening having multiple points of attachment to said body members and a combination hinge-latch mechanism connecting said door to one of said body members at one of said points of attachment, the improvement in said hinge-latch mechanism comprising: a keeper on one of said body members, said keeper defining a recess, an elongated latch member, one end of said latch member received in said recess, cooperating hinge means on the other end of said latch member and said door pivotally securing said latch member to said door and permitting limited rotation of said latch member about its longitudinal axis, cooperating latch means formed on said keeper and said latch member forming a bayonet coupling, and operating means on said door coupled to said latch member for rotating the latter and disengaging said coupling.

2. The combination of claim 1 wherein said cooperating hinge means include a substantially spherical enlargement on said other end of said latch member and concave bearing means on said door receiving and partially surrounding said enlargement.

3. The combination of claim 1 wherein said cooperating latch means further include a shoulder formed on said keeper and extending into said aperture and a helical projection on said latch member.

4. In a motor vehicle having body members framing a substantially upright opening, a dual action door secured to said members, movable into and out of said opening and having four points of attachment to said body members, the improvement comprising: a combination hinge-latch mechanis mconnecting said door to one of said body members, said mechanism including a keeper on said one body member defining a recess facing said door, an elongated latch member cooperating hinge means on one end of said latch member and said door pivotally securing said latch member to said door and permitting rotation of said latch member about its longitudinal axis, the other end of said latch member capable of being moved into a position wherein said other end is received in said aperture, cooperating bayonet coupling means on said keeper and said latch means capable of releasably securing said other end in said recess, and operating means on said door operatively coupled to said latch member for rotating the latter from a coupled position to an uncoupled position.

5. The combination of claim 4, wherein said cooperating hinge means include a substantially spherical enlargement on said one end of said latch member and concave bearing means on said door receiving and partially surrounding said enlargement.

6. The combination of claim 4, said combination hinge latch mechanism further including resilient means operatively bearing on said latch member and exerting a force biasing said latch member into the coupled position.

7. The combination of claim 6 wherein said cooperating latch means further include a shoulder formed on said keeper and extending into said aperture, said shoulder having a first surface proximate said door and a second surface remote from said door, and a helical projection extending longitudinally along a portion of said latch member, said projection abutting said second shoulder surface when said other end of said latch member is received in said aperture and said latch member is in the coupled position.

8. The combination of claim 6, said cooperating bayonet means including cam means exerting a force rotating said latch member against the force exerted by said resilient means into the uncoupled position while said other end of said latch member is moving into said aperture, said cam means becoming inoperative upon the reception of said other end of said aperture.

References Cited

UNITED STATES PATENTS

| 2,306,967 | 12/1942 | Mack | 292—59 |
| 3,018,508 | 1/1962 | Keeling | 16—147 |
| 3,018,509 | 1/1962 | Sherman | 16—147 |
| 3,030,656 | 4/1962 | Hopkins | 16—147 |

FOREIGN PATENTS

| 1,009,053 | 5/1957 | Germany. |

DAVID J. WILLIAMOWSKY, *Primary Examiner.*

DENNIS L. TAYLOR, *Assistant Examiner.*